July 14, 1936.                E. G. LINDER                2,047,930
                              RADIO APPARATUS
                           Filed Aug. 31, 1933           3 Sheets-Sheet 1
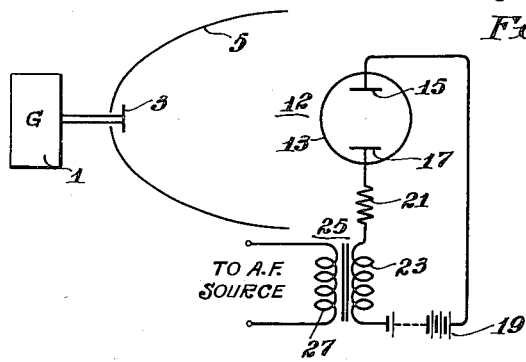
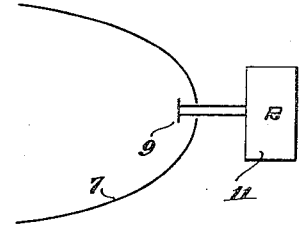
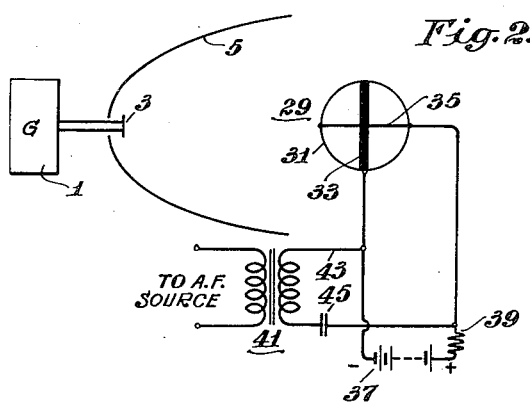
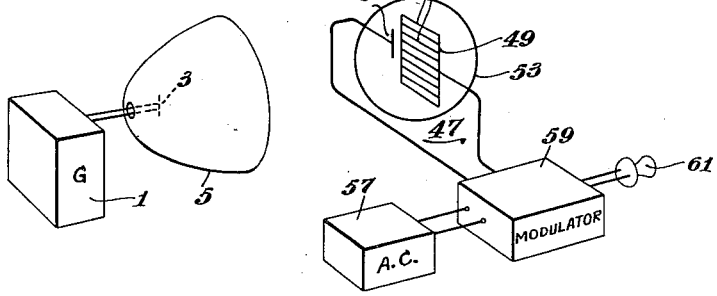
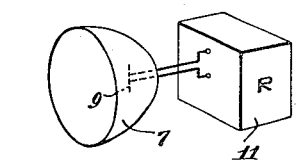
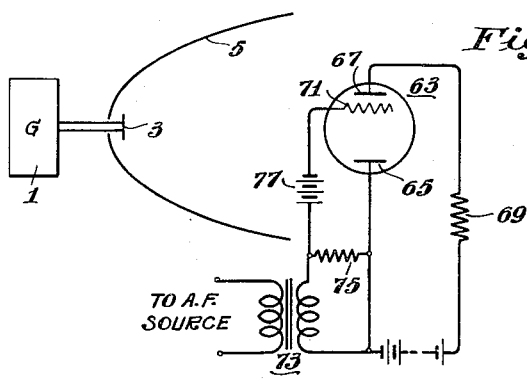
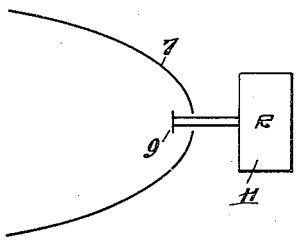
INVENTOR:
Ernest G. Linder,
BY [signature]
HIS ATTORNEY.

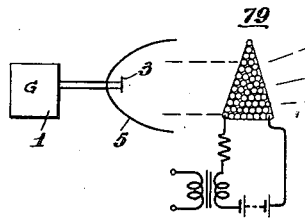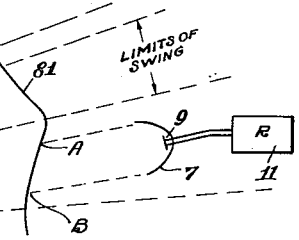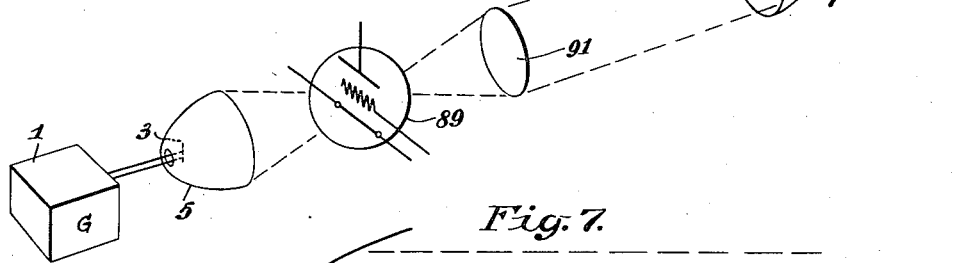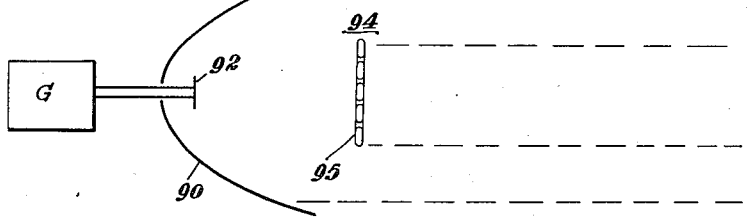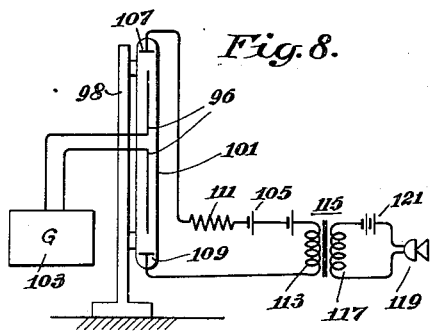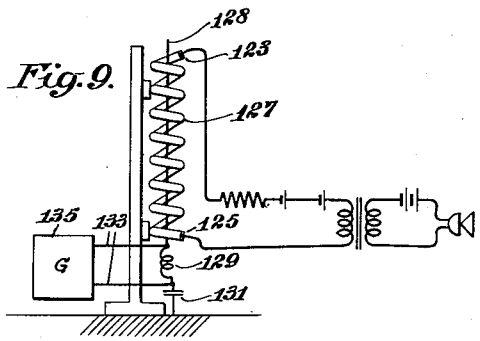

July 14, 1936. E. G. LINDER 2,047,930
RADIO APPARATUS
Filed Aug. 31, 1933 3 Sheets-Sheet 3
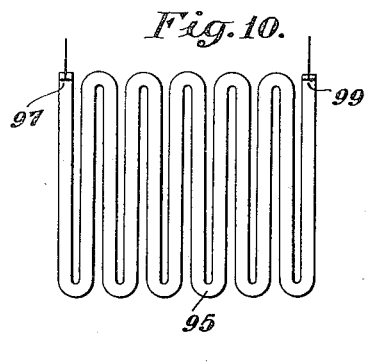
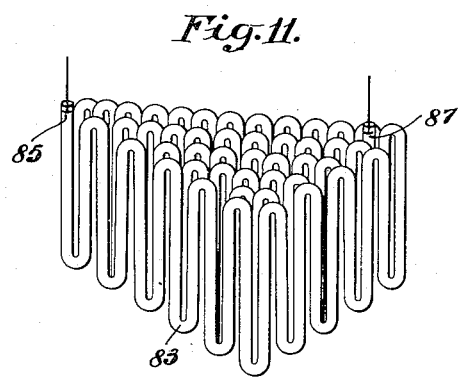
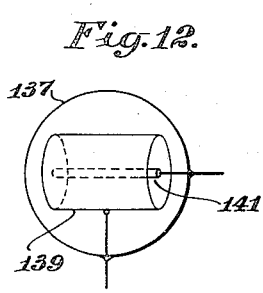
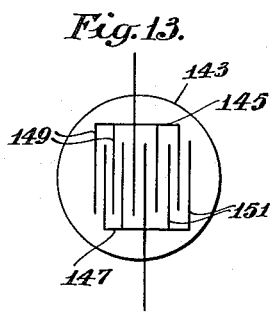
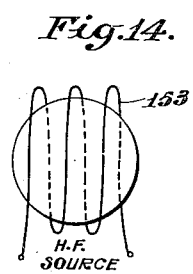
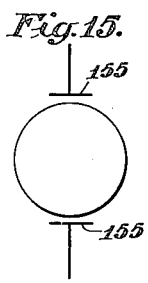
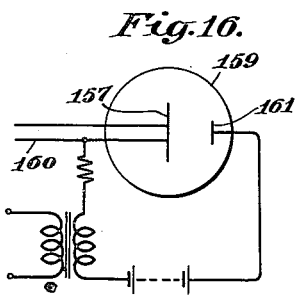
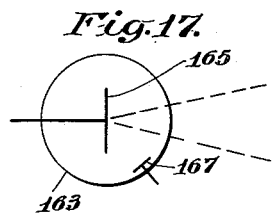
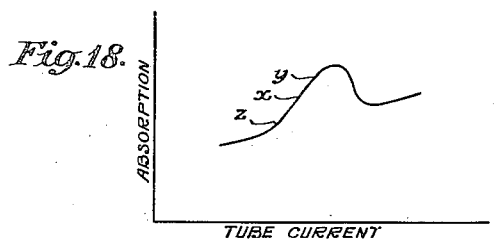
INVENTOR:
Ernest G. Linder
BY T. R. Goldsborough
HIS ATTORNEY.

Patented July 14, 1936

2,047,930

UNITED STATES PATENT OFFICE 2,047,930

RADIO APPARATUS

Ernest G. Linder, Camden, N. J., assignor to Radio Corporation of America, New York, N. Y., a corporation of Delaware Application August 31, 1933, Serial No. 687,544

24 Claims. (Cl. 250—6)

My invention relates to radio apparatus and particularly to means for modulating and demodulating radio energy having a short wave length.

While there are many advantages in the use of such radio energy, it is difficult to modulate it to the desired degree without changing its wave length. In other words, instead of obtaining a pure amplitude modulation, both amplitude and frequency modulation are obtained.

It is also difficult to receive radio energy having a very short wave length because a slight variation in the frequency of the received energy prevents the energy from passing through the tuned circuit of the receiver.

It has been discovered that the difficulty in modulating such energy can be overcome by intercepting the path of the radio waves by means of a device which is electrically independent of the high frequency generator and by varying the electrical or mechanical characteristics, or both, of this device in accordance with a signal. Such a system is described and claimed in a copending application of Irving Wolff, Ser. No. 687,599 filed August 31, 1933, and assigned to the same assignee as this application.

An object of my invention is to provide an improved method and means for modulating high frequency radio energy in a system of the above-mentioned type.

More specifically, an object of my invention is to provide an improved method and means for providing a high percentage of modulation of radio energy at very short wave lengths without producing frequency variations therein.

A further object of my invention is to provide means for transmitting a sharp beam of modulated radio energy.

A still further object of my invention is to provide an improved receiving device for high frequency radio energy.

In practicing my invention, I improve upon the system disclosed in the above-mentioned Wolff application by interposing a region of free electric charges in the path of a radio wave and controlling a condition of said region in accordance with a signal, whereby the radio wave is modulated. Specifically, I prefer to interpose a region of ionized gas in the path of the radio wave and to vary the degree or character of ionization in accordance with a signal.

I also avoid the use of a tuned receiver circuit and the consequent difficulty in tuning by utilizing an electric discharge device positioned at the receiver in the path of an incoming signal.

Other features and advantages of my invention will appear from the following description when taken in connection with the accompanying drawings in which Figures 1 to 7 are schematic diagrams of embodiments of my invention utilizing a beam of radio energy;

Fig. 8 is a schematic diagram of another embodiment of my invention in which the radio energy is broadcast instead of being concentrated into a beam;

Fig. 9 is a schematic diagram of a modified form of the invention as illustrated in Fig. 8;

Figs. 10 to 17 are views showing various forms of modulating devices which may be utilized in practicing my invention; and Fig. 18 is a curve showing the selective absorption characteristic of the gases preferably utilized in certain of said modulation devices.

The embodiment of the invention illustrated in Fig. 1 comprises a high frequency generator 1, such as a magnetron oscillator, electrically connected to a dipole antenna 3 located inside a parabolic reflector 5. The energy radiated by the antenna 3 is directed into the form of a beam by the reflector 5 and is transmitted to a receiving reflector 7 which has a dipole antenna 9 located therein and connected to a radio receiver 11.

In the past it has been customary to signal over such a radio beam by modulating the high frequency energy at the generator itself, in which case the modulated radio energy is impressed upon the transmitting antenna. It is difficult to obtain a radio beam of constant low wave length having amplitude modulation, for the reason that it has been found in practice that the modulating device at the generator may cause the frequency of the generator output wave to change.

In accordance with the above-mentioned embodiment of my invention, I pass the radio beam through the electric discharge of a modulating device 12 positioned in the path of the radio beam and electrically independent of the high frequency generator. This device comprises an envelope 13 filled with a gas, such as one of the noble gases, which can readily be ionized.

Electrodes 15 and 17 are positioned inside the envelope 13 and are connected to a source of ionizing potential 19 through a resistor 21 and the secondary 23 of an audio or modulation signal frequency transformer 25, the resistor 21 being provided to limit the flow of current through the ionized gas. The primary 27 of the audio frequency transformer 25 is connected to the source of modulating current which is indicated on the drawings as being an audio frequency source.

By means of this circuit, the gas in the envelope 13 is maintained constantly ionized by the direct current potential of source 19, while the degree of ionization is varied in accordance with the modulating voltage appearing across the secondary 23. I have found that such a device will produce an undistorted modulated radio beam at the receiver. For example, if voice currents are put through the primary 27, the voice can be heard at the receiver in its original undistorted form.

The modulating device 12 may be positioned to intercept the radio beam at any point, although obviously the preferred position is relatively close to the transmitter reflector 5. If desired, the envelope may be placed inside the transmitter reflector, itself.

The modulating effect caused by the ionized gas is due to various properties of the gas. The modulating voltage varies the density and distribution of ionization within the envelope and hence the electrical and optical properties of the gas, such as dielectric constant, conductivity, coefficient of absorption, coefficient of reflection, diffuse scattering, temperature, etc.

The above described apparatus provides substantially pure amplitude modulation. The stability of the transmitter is much better than that of the usual short wave transmitter since the oscillating circuit of the generator is not seriously interferred with. In fact, the only interference with the oscillating circuit is that produced by the small amount of energy which may be reflected from the ionized gas back into the reflector. This reflected energy may vary the load on the antenna slightly.

Where a plane of ionized gas is utilized for modulating, the energy reflected therefrom may be prevented from reaching the transmitter reflector by setting the modulating reflector at an angle to the axis of the radio beam, as explained in the above-identified Wolff application.

A further advantage inherent in this type of system is that a radio beam of greater intensity can be obtained from a given oscillator, since the oscillator may be adjusted for maximum output without regard to where the operating point lies on the characteristic curve of the oscillator. That is, the oscillator and modulator adjustments are independent of each other.

If desired, in the system shown in Fig. 1, amplitude modulation may be put on the beam at the generator 1 in a conventional manner and this modulation added to the modulation produced by the tube 12, care being taken to keep the two modulations in phase.

In Fig. 2 are shown both my improved receiver and a modification of the modulating device illustrated in Fig. 1. The modulating device 29 comprises a spherical envelope 31 containing gas which may be ionized by a suitable potential across two electrodes 33 and 35. In this modification the electrode 33 is a metallic ring which is coated on the inside of the envelope 31. The electrode 35 is a conductor extending through the center of the ring electrode 33 and normal to its plane. A steady ionizing potential is applied to the electrodes 33 and 35 from a suitable direct current source such as a battery 37, through a current limiting resistor 39.

The modulating voltage is impressed upon the electrodes 33 and 35 by means of an audio frequency transformer 41 connected to the electrodes through a conductor 43 and a blocking condenser 45.

The general effect of the modulating device 29 is the same as that of the device 12 shown in Fig. 1. It will, however, produce one additional effect upon the beam since it is designed to act as a diverging lens when the ring electrode is negative. The amount that the beam is caused to diverge is dependent upon either the degree or distribution of ionization of the gas, or both. It follows, therefore, that even if the other properties of the gas, mentioned above, were unchanged, the device would modulate the beam solely by the lens action. If desired, the modulating device 29 may be employed with the specific form of modulating circuit shown in Fig. 1.

The electric lens 29 is described and claimed in application Serial No. 687,575, filed August 31, 1933, in the name of Vladimir K. Zworykin.

The receiving apparatus illustrated in Fig. 2 includes a gas-filled tube 30 positioned at or near the principal focus of a parabolic reflector 32. Preferably, the tube 30 is placed at the principal focus of the reflector 32 although this exact position is not essential for satisfactory operation. The tube 30 comprises an envelope 34 filled with a gas, such as neon, which can be readily ionized by means of a voltage applied across two electrodes 36 and 38 mounted in the envelope 34.

Two conductors 40 and 42 serve both as a support for the tube 30 and as means for connecting the electrodes 36 and 38 to a source of ionizing potential 44 through a resistor 46 and the primary winding 48 of an audio-frequency transformer 50. The transformer 50 transfers the current variations of the tube circuit to an audiofrequency amplifier 52 which has a loud speaker 54 connected to its output circuit.

The present theory of operation of my receiver is based upon the apparently correct assumption that the modulated radio beam varies the degrees of ionization of the gas in tube 30. Since the degree of ionization varies in accordance with the amplitude of the received energy, the current transferred to the audio amplifier 52 will correspond to said variations in amplitude. That is, the audio amplifier output will correspond to the modulation on the radio beam.

The degree of ionization of the gas in tube 30 probably is varied by the passage of the radio beam through the gas. It may be, however, that the received beam sets up varying potentials on the electrodes, and that these potentials cause the change in ionization.

In the embodiment shown in Fig. 3, the receiving and transmitting apparatus of Fig. 1 is shown in connection with a modulating means in which the ionized gas device 47 has two electrodes 49 and 51 so arranged that a plane of ionized gas is formed inside the envelope 53. The plane of the ionized gas coincides with the plane of the electrode 49. Preferably the spacing between the grid wires 55 of the electrode 49 is small in comparison with the wave length of the radio beam, and the gas pressure is such that the Crookes dark space is small in comparison with the spacing between the grid wires 55.

Ionization may be maintained by means of current having a super-audible frequency. A super-audible frequency generator indicated at 57 is connected to a modulator 59 which may be of any of the well known designs. The modulating frequency may be supplied from a microphone 61 connected to the modulator 59. If desired, the ionizing and modulating potentials may be applied to the electrodes 49 and 51 by means of either the circuit shown in Fig. 1 or the circuit shown in Fig. 2, in which case the electrode 49 is negative, being connected to the negative terminal of the direct current source.

When using a grid composed of wires as one electrode, as illustrated in Fig. 3, certain precautions must be taken to insure proper operation of the device. It is well known that a transmitter of the type shown generates a radio beam which is strongly polarized in the plane of the dipole antenna 3, for example, in a vertical plane. Since the grid wires 55 are spaced closer together than one wave length, they will act as a reflector, substantially the same as a solid sheet of metal, if they are placed so that they run parallel to the plane of polarization. This difficulty can be avoided by so placing the electrode 49 that the closely spaced wires 55 are perpendicular to the plane of polarization, or in the example given, placed so they are horizontal.

If desired, a third electrode may be employed for varying the degree of ionization of a modulating device 63 as illustrated in Fig. 4. The transmitter and receiver of Fig. 1 are shown in connection with a further modification of modulator means. In this arrangement, a constant ionizing potential is impressed across electrodes 65 and 67 through a resistor 69, while the modulating voltage is impressed upon a control grid 71 through an audio frequency transformer 73 shunted by a resistor 75. Preferably, the control grid 71 is negatively biased with respect to the anode 65, as by means of a battery 77.

While the degree of control of the ionized gas discharge obtained by means of the control grid 71 will not be very great, it will be sufficient for modulating the radio beam, especially if the control grid 71 is placed in the Crookes dark space.

In the form of my invention illustrated in Fig. 5, the ionized gas modulating device 79 is shaped in the form of a prism so that the radio beam will be bent as it passes through the prism. Its construction will hereinafter be explained. The amount of bending will depend upon the degree of ionization of the gas, and may be controlled by means of the modulating circuit illustrated, which is the same as the circuit shown in Fig. 1, or, if preferred, by means of the circuits shown in Figs. 2 and 3.

In order to obtain undistorted modulation by means of the system shown in Fig. 5, the receiving reflector 7 should be placed in a certain definite location with respect to the energy distribution in the radio beam which is in the form of a cone. The energy distribution in the beam is indicated by the curve 81. It will be noted that the amount of energy is greatest at the center of the cone and that at each side of the center of the cone there is a portion of the curve between the points A and B which is substantially a straight line. It is desirable to have the portion of the beam corresponding to this straight line portion swing back and forth in front of the receiving reflector 7. This will be accomplished if the center line of the cone is swung between the limits indicated on the drawings.

The prism used in the system of Fig. 5 may be constructed in various ways. One form of construction is shown in Fig. 11 to which attention is directed, along with Fig. 5. This prism may comprise a single long tube 83 which is bent back and forth upon itself and shaped in the form of a prism. The tube is filled with a gas such as neon, for example, which can be ionized by means of two electrodes 85 and 87, one at each end of the tube 83.

When the length of the radio beam is such that the reflector 5 must be relatively large in comparison with glass envelopes which can at present be made readily, it may be desirable to so design the reflector 5 that the beam is focused by the reflector as shown in Fig. 6. This permits the use of a smaller envelope 89 for the free electric charges, since it may be placed at or near the principal focus of the reflector 5 where the cross-section of the radio beam is small. After the beam passes through the device 89, its rays may be made substantially parallel by means of a lens 91 so that the beam can be directed to a remote receiving reflector 7. As illustrated, the device 89 may comprise a hot cathode, a control grid, and an anode for producing a plane of pure electron discharge in the path of and at right angles to the radio beam. By varying the potential on the control grid and thus varying the intensity of the discharge, between the cathode and anode, the radio beam may be modulated.

In Fig. 7, there is illustrated an embodiment of my invention which makes possible the transmission of a sharply defined modulated beam of radio energy. When forming a beam of radio energy even at wave lengths of a few centimeters, it is difficult to obtain a beam of small cross-section which is sharply defined since the wave length is not extremely small in comparison with the reflector dimensions as in the case of light.

In the apparatus shown in Fig. 7, the reflector, indicated at 90, is made large enough to sharply define the energy radiated from the dipole antenna 92. The resulting beam necessarily has a fairly large cross-section so that the location of the receiving reflector need not be very exact to receive part of the beam. This may be undesirable in some instances, as in the case of secret signaling.

Therefore, instead of modulating the entire beam, I position one of my ionized gas modulating devices 94 in the path of a portion of the radio beam. The device 94 will cast a modulated shadow which will be smaller in cross-section than the beam itself and will, in effect, give a sharper radio beam.

The device 94 is of a type which modulates by absorption, reflection, and/or scattering, that is, it should not be a type which disperses the beam. The device 94 illustrated in Fig. 7 is shown in detail in Fig. 10. It comprises a long gas filled tube 95 bent back and forth upon itself to form a rectangular grid. Electrodes 97 and 99 are provided at each end of the tube 95 by means of which the gas may be ionized. The spacing between adjacent portions of the tube 95 should preferably be relatively close and in any case less than one wave length of the radio beam.

Instead of the device shown in Fig. 10, either the one shown in Fig. 3 or the one shown in Fig. 13 (and described hereinafter) may be utilized.

My invention is not restricted to beam transmission systems, but may be applied to transmitting systems in which the radio energy is radiated in all directions. For example, as illustrated in Fig. 8, a dipole antenna 96 mounted upon a non-conducting mast 98 may be surrounded completely by ionized gas enclosed in a long glass tube 101. In this arrangement, the high frequency generator 103 connected to the antenna may, for example, generate energy having a wave length of the order of two or three meters.

The modulating circuit comprises a source of direct current potential 105 connected to electrodes 107 and 109 positioned at the ends of the tube 101 to provide a modulating device. The electrode circuit includes a resistor 111 and the secondary 113 of an audio frequency transformer 115. The primary 117 of the transformer is connected to a microphone 119 through a potential source or battery 121.

Instead of a dipole antenna, one of the type illustrated in Fig. 9 may be enclosed by the envelope 101. In Fig. 9, however, the antenna is not located in the ionized gas, so that it is in contact with the gas, but is surrounded by a helical tube of ionized gas which may be wound as shown, or otherwise disposed around the antenna. In this arrangement, electrodes indicated at 123 and 125 at the ends of the gas filled tube 127 are connected to a modulating circuit, which is the same as the one shown in Fig. 8.

Radio energy may be supplied to the antenna 128 by means of any of the well known coupling circuits. In the circuit illustrated, the lower end of the antenna 128 is connected to the upper end of an inductance coil 129 which has its lower end connected to one terminal of a condenser 131, the other terminal of condenser 131 being connected to ground. A transmission line 133 is provided to couple the generator 135 to the inductance coil 129.

In constructing my ionized gas modulating device, many variations of the structures illustrated may be utilized. Some examples of such variations are illustrated in Figs. 12 to 17.

Fig. 12 illustrates a form of tube which may be substituted for the tubes 12 and 29 shown in Figs. 1 and 2, and comprises a gas filled envelope 137 having a cylindrical electrode 139 and a rod-like electrode 141 concentric with the cylinder 139. When employed for modulation purposes, the tube is preferably positioned with the electrode 141 parallel to the axis of the radio beam.

Fig. 13 illustrates another electrode arrangement for obtaining a plane of ionized gas. This device comprises a gas filled envelope 143 in which electrodes 145 and 147 have interleaving elements 149 and 151, respectively. The elements 149 and 151 may be in the form of rods, all positioned in the same plane. It is apparent that with this structure, the plane of ionized gas coincides with the plane of the electrodes 145 and 147.

The ionization of the gas in a modulating device may be obtained by the use of either an external coil 153, as shown in Fig. 14, or external electrodes 155, as shown in Fig. 15, and the use of a high frequency ionizing potential. The tubes shown in Figs. 14 and 15 may be substituted for the tube 47 shown in Fig. 3 and satisfactory modulation of the radio beam obtained, providing a high frequency source, such as a radio frequency source, is substituted for the super-audible frequency source 57.

In Fig. 16 there is illustrated an arrangement in which a dipole antenna 157 is enclosed in a gas filled envelope 159 to form one of the ionizing electrodes. The other electrode is indicated at 161. When using this device, the ionizing and modulating potentials may be impressed across the electrodes 157 and 161 by a circuit like the one shown in Fig. 1. The connection to the antenna electrode 157 is made at a voltage node on the conductor 160. If a radio beam is to be transmitted, the envelope 159 will be positioned at the proper point inside a reflector.

Fig. 17 illustrates a device for modulating a radio beam by reflecting the beam a variable amount. The gas filled envelope 163 contains a cathode 165 in the form of a wire grid or grating, which may be either plane or curved, and an anode 167. If the proper potential is impressed across the electrodes 165 and 167, a layer of ionized gas will form along the surface of the cathode 165. This ionized plane of gas will reflect a certain percentage of the energy in a radio beam. The reflecting property of the plane of gas may be utilized in a communication system by positioning the receiver in the path of the reflected beam. As the reflecting ability of the gas layer is varied by the variation in ionization, the amount of reflected energy which reaches the receiver will vary in accordance with the variation in voltage applied to electrodes 165 and 167.

My invention is not restricted to the use of an ionized gas discharge. Any other type of discharge may be employed which provides a region containing free electrical charges. For example, the use of a glow discharge, a corona discharge, a spark discharge, a pure electron discharge, a pure positive ion discharge, comes within the scope of my invention. Also, it is obvious that ionization of the gas may be produced by agencies other than those illustrated. For example, I may ionize the gas of a modulating tube by means of ultraviolet light, X-rays, heat, or any combination of these.

The nature of the gas employed in the various modulating devices described may vary widely. Either pure gases or gas mixtures may be employed, but preferably noble gases are used. The gas pressure may vary from zero, where there is a pure electron discharge, up to the highest pressure at which a discharge can be produced. It will be understood that the pressure of the gas in tubes such as the ones shown in Figs. 1, 2 and 10 should be such that a uniform glow or region of ionization fills the greater part of the envelope. In general, this pressure will be less than the pressure in tubes such as 53 and 143, shown in Figs. 3 and 13, respectively, where the flow is to be confined to the region of an electrode.

Since some ionized gases show selective absorption for certain wave lengths due to plasma oscillations of electrons or ions, greater efficiency of modulation and demodulation may be obtained by operating near or at such absorption band. Fig. 18 shows how one of my modulating devices operating in the neighborhood of an absorption band (the device shown in Fig. 1, for example), will absorb the radio beam as the current through the modulating device is changed.

It is well known that certain gases exhibit a resonant effect which causes them to absorb a comparatively large amount of energy having a wave length corresponding to the resonant point of the gas. Assume that a radio beam of a certain wave length is impressed upon one of my gas modulating devices as shown in Fig. 1, Fig. 2, or Fig. 3, for example. If the gas pressure is made the proper value, the current through the modulating device can be increased until the gas absorbs the beam the maximum amount, that is, a resonant peak is obtained.

This resonant effect may be utilized in modulating the beam by adjusting the current through the modulating device until the point $x$ on the curve is reached. The modulation then varies the modulating tube current about the point $x$ so that the absorption of the radio beam is varied between the limits $y$ and $z$.

The selective absorption effect may be utilized also with the demodulator shown in Fig. 2. In utilizing this effect, the unmodulated radio beam will be directed into the receiving reflector 32 and the current through tube 34 brought to a value (as by adjusting resistor 46) corresponding to the point $x$ on the curve shown in Fig. 18. With such an adjustment, variations in the radio beam intensity (amplitude modulations) will produce comparatively large variations in the current flowing through tube 34.

It will be apparent that various other modifications may be made in my invention without departing from the spirit and scope thereof, and I desire, therefore, that only such limitations shall be placed thereon as are necessitated by the prior art and are imposed by the appended claims.

I claim as my invention:

1. The method of signaling which comprises generating and transmitting electromagnetic radio frequency energy in the form of a beam, creating a region containing free electric charges in the path of said beam, and varying the ionization of said region in accordance with a signal.

2. The method of signaling which comprises generating and transmitting electromagnetic energy of radio frequency in the form of a beam, creating a region of ionized gas in the path of said beam, and varying the degree of ionization of said gas in accordance with a signal.

3. The method of signaling which comprises generating and transmitting electromagnetic energy of radio frequency in the form of a beam, creating a region of ionized gas in the path of said energy, varying the degree of ionization of said gas in accordance with a signal, and absorbing energy from said transmitted radio frequency energy.

4. In a radio system, means for generating electric energy of a high radio frequency, means for radiating said energy, and means including an electronic discharge device positioned in the path of the radiated energy for modulating said energy in accordance with a signal after said energy has been radiated.

5. In a radio system, means for generating electric energy of a high radio frequency, means for radiating said energy, means providing a region containing free electric charges for intercepting said radiated energy, and means for varying the ionization of said region in accordance with a signal.

6. In a signaling system, means for generating and transmitting a beam of radio frequency electric energy, and means including an electronic discharge device positioned in the path of said beam for modulating it in accordance with a signal.

7. In a radio system, means for generating and transmitting radio frequency electric energy, a modulating device positioned in the path of said radiated energy, said device comprising a gas-filled envelope, means for ionizing said gas, and means for varying the ionization of said gas in accordance with a signal.

8. Electrical apparatus comprising means for generating electric energy at a high radio frequency, means for transmitting said energy in the form of a beam, an ionized gas device so positioned that it intercepts said beam and means including said device for modulating said beam in accordance with a signal.

9. Electrical apparatus comprising means for generating electric energy at a high radio frequency, means including a reflector for transmitting said energy in the form of a beam, an ionized gas device positioned in front of said reflector, and means for varying the ionization of said gas in accordance with a signal.

10. Electrical apparatus comprising means for generating electric energy at a high radio frequency, means for transmitting said energy in the form of a beam, a gas-filled envelope positioned to intercept said beam, means for ionizing said gas, and means for varying the degree of ionization of said gas in accordance with signals.

11. Electrical apparatus comprising means for generating electric energy at a high radio frequency, means for transmitting said energy in the form of a beam, means for intercepting said beam by a confined gas, and means for controlling the ionization of said gas in accordance with a signal.

12. Electrical apparatus comprising means for generating electromagnetic energy at a high radio frequency, means for transmitting said energy in the form of a beam, means for intercepting said beam by an ionized confined gas, and means for controlling the electromagnetic energy absorbing properties of said ionized gas in accordance with a signal.

13. Electrical apparatus comprising means for generating electromagnetic energy at a high radio frequency, means for transmitting said energy in the form of a beam, means for intercepting said beam by an ionized confined gas, and means for controlling the degree of ionization in accordance with a signal.

14. The method of signaling which comprises generating electromagnetic energy of a radio frequency, transmitting it in the form of a beam, creating a region of electric discharge positioned within the path of only a portion of said beam, and varying the ionization of said electric discharge in accordance with a signal whereby a modulated shadow of said beam is transmitted.

15. In a signaling system, means for generating electric energy of a radio frequency, means for concentrating said energy into the form of a beam, said second means comprising a reflector of dimensions large enough with respect to the wave length of said energy to produce a well defined beam, means for creating a region of electric discharge within the path of only a portion of said beam, and means for varying the electric energy absorbing properties of said electric discharge in accordance with a signal whereby a modulated shadow of said beam is transmitted.

16. In a signaling system, means for generating electric energy of a radio frequency, means for concentrating said energy into the form of a beam, said second means comprising a reflector of dimensions large enough with respect to the wave length of said energy to produce a well defined beam, means for creating a plane of ionized gas approximately normal to the axis of said beam and positioned within the path of only a portion of said beam, and means for varying the ionization of said gas in accordance with a signal whereby a modulated shadow of said beam is transmitted.

17. In combination, means for radiating a beam of electric energy of radio frequency, an electric discharge device positioned in the path of said beam for modulating said beam, and means comprising a control electrode in said device for controlling said discharge in accordance with a signal.

18. In combination, means for radiating a beam of electric energy of said frequency, a modulating device positioned in the path of said beam, said device comprising a gas-filled envelope having two main electrodes and a control electrode, means for impressing an ionizing potential across said main electrodes, and means for impressing a modulating potential upon said grid.

19. In combination, means for radiating a beam of electric energy of radio frequency, a modulating device positioned in the path of said beam, said device comprising means for confining gas in the shape of a prism, means for ionizing said gas whereby said radio beam is refracted, and means for varying the ionization of said gas in accordance with a signal.

20. In combination, means for radiating a beam of electric energy of radio frequency, receiving means for intercepting a portion of said beam, and means consisting of a confined gas for swinging the axis of said beam in accordance with a signal.

21. In combination, means for radiating a beam of electric energy of radio frequency, having a field strength distribution which is approximately linear over a certain region, receiving means for intercepting said beam within said region, and means including an ionized gas for deflecting said beam in accordance with a signal, the limits of deflection being such that said receiving means always intercepts said beam within said region.

22. In combination, means for radiating a beam of electric energy of radio frequency, a modulating device positioned in the path of said beam, said device comprising a gas-filled envelope, and means for impressing a signal-modulated voltage of superaudible frequency upon said gas, said voltage having a value sufficient to ionize said gas.

23. Electrical apparatus comprising means for generating electric energy at a high radio frequency, means for transmitting said energy in the form of a beam, a gas filled envelope positioned to intercept said beam, means for ionizing said gas, and means for varying the distribution of ionization of said gas in accordance with signals.

24. Electrical apparatus comprising means for generating electromagnetic energy at a high radio frequency, means for transmitting said energy in the form of a beam, a gas filled envelope positioned to intercept said beam, means for ionizing said gas, and means for varying the degree and distribution of ionization of said gas in accordance with signals.

ERNEST G. LINDER.